United States Patent
Banerjee et al.

(10) Patent No.: US 7,324,617 B1
(45) Date of Patent: Jan. 29, 2008

(54) APPARATUS AND METHOD FOR DETECTING DOWNLINK TRANSMIT DIVERSITY AT A MOBILE DEVICE

(75) Inventors: Debarag Narayan Banerjee, Sunnyvale, CA (US); Pascal Gilles Renucci, Sunnyvale, CA (US); Karim Nassiri Toussi, Belmont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 862 days.

(21) Appl. No.: 10/395,992

(22) Filed: Mar. 24, 2003

(51) Int. Cl.
*H04B 7/10* (2006.01)
(52) U.S. Cl. .................................................. 375/347
(58) Field of Classification Search ................ 375/299, 375/295, 347; 370/342, 310, 320, 321
See application file for complete search history.

(56) References Cited

U.S. PATENT DOCUMENTS

| | | | | |
|---|---|---|---|---|
| 5,991,282 A | * | 11/1999 | Langlet et al. | ............... 370/332 |
| 6,141,536 A | * | 10/2000 | Cvetkovic et al. | ............. 455/45 |
| 6,775,260 B1 | * | 8/2004 | Dabak et al. | ................ 370/342 |
| 6,862,275 B1 | * | 3/2005 | Dabak | .......................... 370/342 |
| 2002/0060996 A1 | * | 5/2002 | Kwak et al. | ................. 370/335 |
| 2002/0131382 A1 | | 9/2002 | Kim et al. | |
| 2003/0099216 A1 | * | 5/2003 | Nilsson et al. | .............. 370/335 |
| 2004/0184513 A1 | * | 9/2004 | Lundby et al. | .............. 375/148 |

* cited by examiner

*Primary Examiner*—Emmanuel Bayard
(74) *Attorney, Agent, or Firm*—Brett A. Hertzberg; Merchant & Gould PC (57) ABSTRACT

A mobile device detects downlink transmit diversity. Slot and frame timing knowledge and a downlink scrambling code are applied to pilot and synch channels of the signal. An algorithm suited for the diversity case and an algorithm suited for the non-diversity case are utilized. The output of the diversity algorithm is compared to the output of the non-diversity algorithm. The output yielding the highest energy determines whether downlink transmit diversity is applied. The detection algorithms used in both the diversity and non-diversity cases use phasors to indicate the phase difference between two channels. This phase difference is the basis for determining diversity usage.

18 Claims, 8 Drawing Sheets

APPARATUS AND METHOD FOR DETECTING DOWNLINK TRANSMIT DIVERSITY AT A MOBILE DEVICE

FIELD OF THE INVENTION

The present invention relates to downlink signal transmission, and more particularly to a mobile device that supports downlink transmit diversity.

BACKGROUND OF THE INVENTION

In wireless signal transmission, a base station can use two antennas per transmission to improve signal reception at a mobile device. The base station can apply downlink transmit diversity which utilizes a second antenna to transmit a different version of a signal. The mobile device must be configured to detect when the base station is utilizing downlink transmit diversity. The base station can indicate that transmit diversity is being utilized via higher layer messaging. However, the mobile device cannot access such messages until it is connected to the core network after initial signal acquisition.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed to a mobile device that detects downlink transmit diversity. Slot and frame timing knowledge and a downlink scrambling code are applied to pilot and synch channels of the signal. An algorithm suited for the diversity case and an algorithm suited for the non-diversity case are utilized. The output of the diversity algorithm is compared to the output of the non-diversity algorithm. The output yielding the highest energy determines whether downlink transmit diversity is applied.

The algorithms detect transmission diversity even under harsh channel conditions in both initial acquisition and steady-state modes. In one embodiment of the invention, initial acquisition is characterized by the presence of a constant frequency offset of about 1.5 kHz in the signal, and steady-state is characterized by a constant frequency offset of about 200 Hz.

Figure 1:
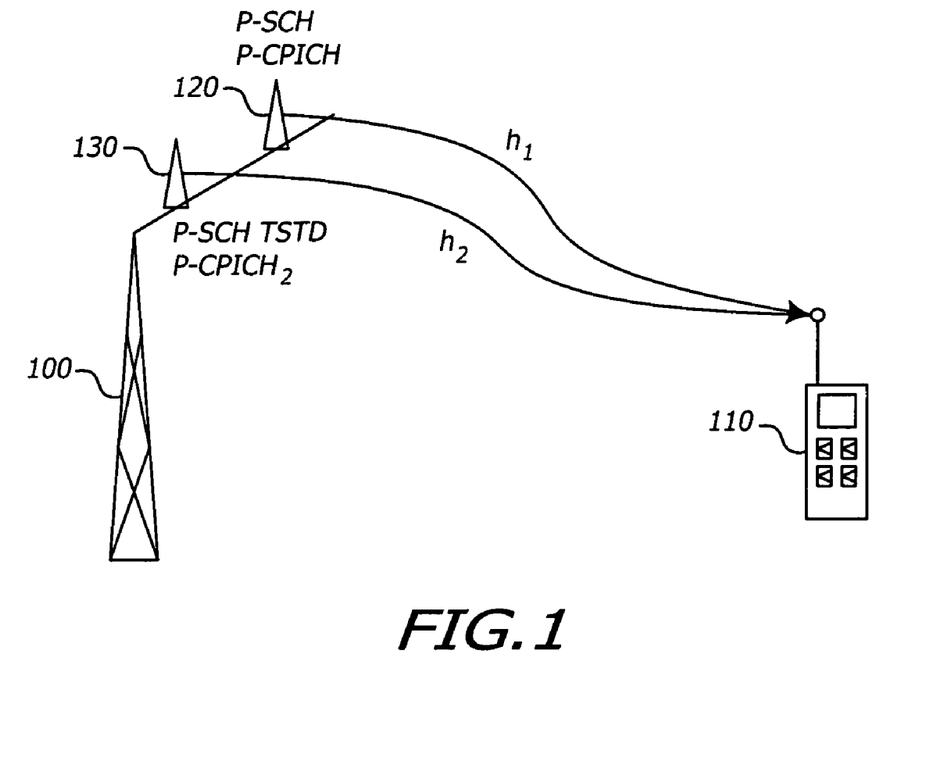
FIG. 1 illustrates a base station transmitting to a mobile device using downlink transmission diversity.

FIG. 1 illustrates base station 100 transmitting a signal to mobile device 110 from first antenna 120 and second antenna 130. Each antenna 120, 130 has a corresponding channel ($h_1$, $h_2$). Channels $h_1$, $h_2$ add phase shifts to the signals by rotating the signal phasor by the angle of $h_1$ and by incorporating the magnitude of $h_1$. Channels $h_1$, $h_2$ are representative of the harmful radio channel effects associated with signal transmission. Channel $h_1$ is not equal to shift channel $h_2$ due to the different physical locations of first antenna 120 and second antenna 130. The following description is specific to the 3GPP WCDMA standard. However, the principles described can be generalized for systems following similar diversity and synchronization protocols.

Each signal includes a pilot channel (P-CPICH) and a synch channel (P-SCH). Both the pilot channel and the synch channel contain known fixed data. The data format of the synch and pilot channels depends on whether diversity is applied.

Figure 2:
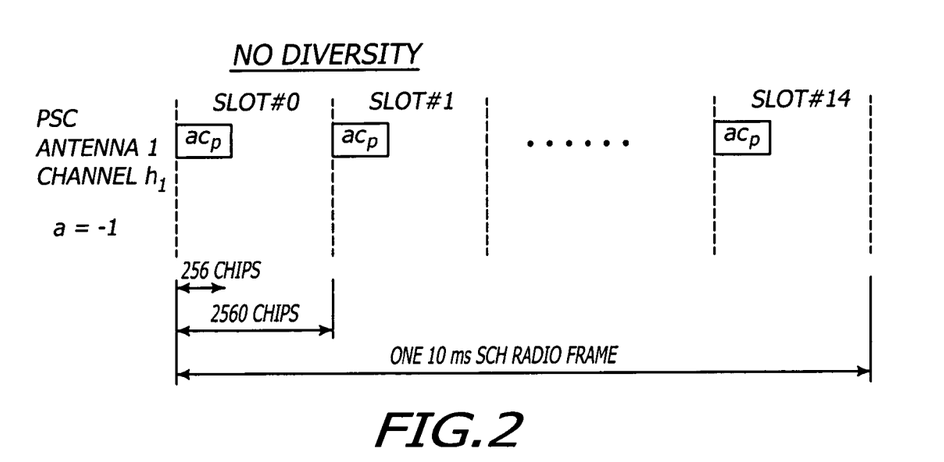
FIG. 2 illustrates an exemplary structure of a radio frame of a synch channel of a signal in a non-diversity transmission scenario.
Figure 3:
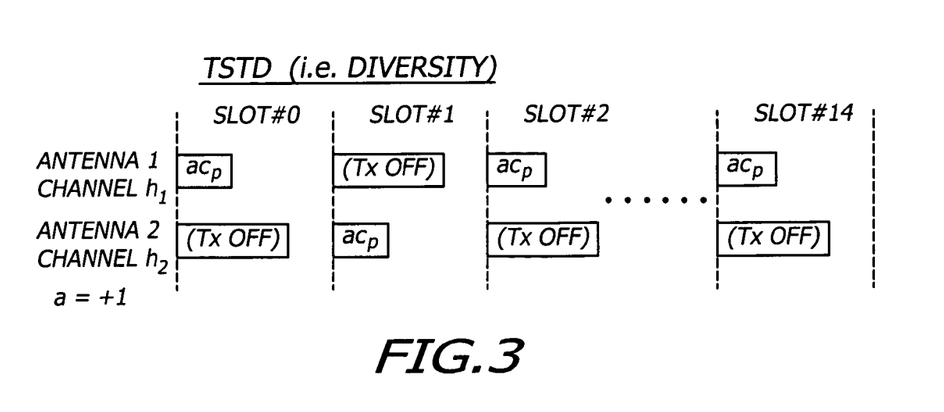
FIG. 3 illustrates an exemplary structure of a radio frame of the synch channel of a signal when the base station is applying downlink transmission diversity.
Figure 5:
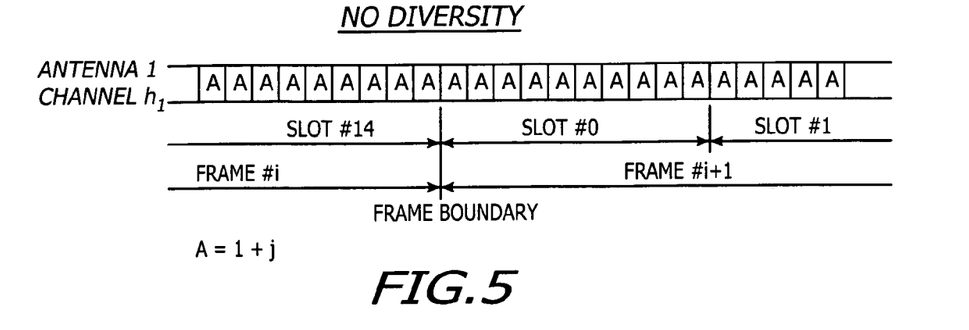
FIG. 5 illustrates an exemplary structure of a pilot channel in the non-diversity transmission scenario.
Figure 6:
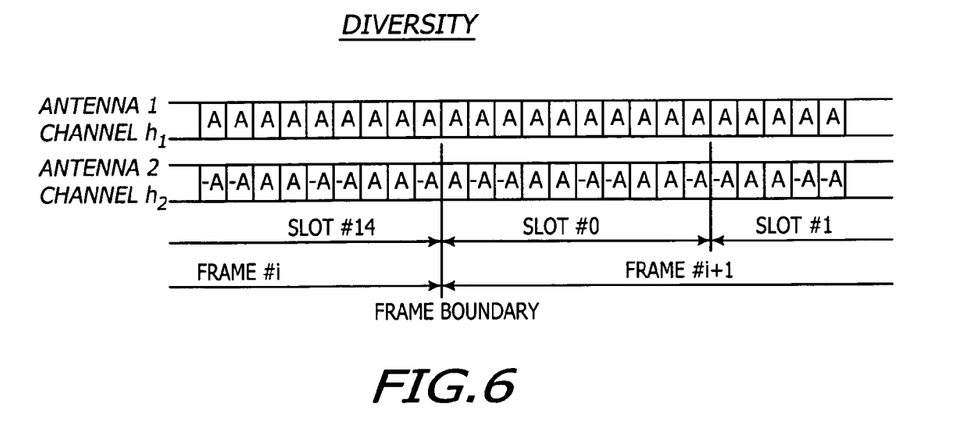
FIG. 6 illustrates an exemplary structure of the pilot channel when the base station is applying downlink transmission diversity.

During non-diversity downlink transmission, base station 100 transmits the pilot channel and the synch channel from first antenna 120 via channel $h_1$. The synch channel in non-diversity mode is shown in FIG. 2, and the pilot channel in non-diversity mode is shown in FIG. 5. Base station 100 encodes the signal using the scrambling code. During diversity downlink transmission, base station 100 transmits a signal from first antenna 120 and transmits a different version of the signal from second antenna 130. The synch channel uses Time Switched Transmit Diversity (TSTD) as shown in FIG. 3, and the diversity mode of the pilot channel is shown in FIG. 6. A transmit diversity application of mobile device 110 derotates the received signal to undo the channel phase rotation.

FIG. 2 illustrates an exemplary structure of a radio frame of the synch channel in the non-diversity transmission scenario in accordance with aspects of the invention. As illustrated, each frame is 10 milliseconds and includes fifteen slots. Each slot comprises 2560 chips. The downlink physical channels are transmitted from the first antenna to the mobile device in a standard fashion when transmit diversity is not applied. A primary synchronization code (PSC) contains timing information associated with the signal. PSC is transmitted and included at the beginning of each slot for channel $h_1$. PSC is identified by the relationship $ac_p$, where $c_p$ is a pattern of bits used by all base situations. In non-diversity downlink transmission, the synch channel is modulated with the symbol a=−1.

FIG. 3 illustrates an exemplary structure of the synch channel when the base station is applying downlink transmission diversity. PSC is transmitted alternately between the first antenna and the second antenna for each slot. In diversity downlink transmission, the synch channel is modulated with the symbol a=+1.

The structure and content of the synch channel are known and a is present for both diversity and non-diversity cases. The basic principle of diversity detection is to determine the sign of a on the synch channel. If a=+1, transmit diversity is applied. If a=−1, transmit diversity is not used.

Figure 4:
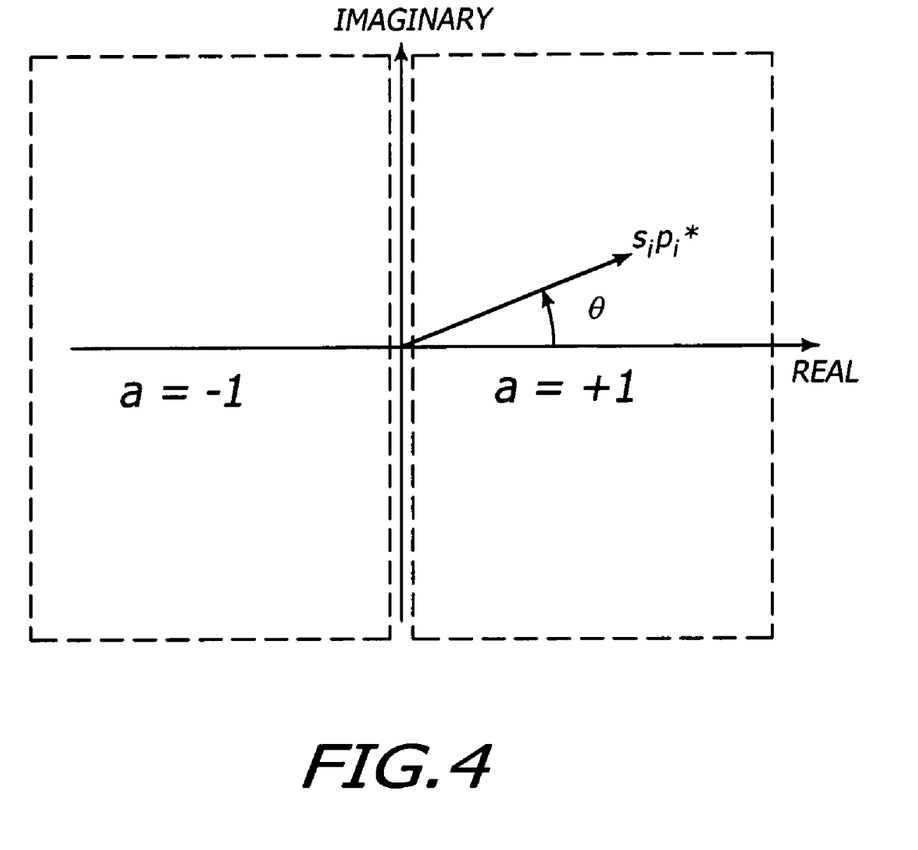
FIG. 4 illustrates a phasor diagram of the phase difference between the synch channel and the pilot channel.

FIG. 4 illustrates a phasor diagram of the phase difference between the synch channel and the pilot channel. The angle (θ) of the phasor (correlation metric $s_i p_i$ to be explained in detail below) represents the phase difference between the synch channel and the pilot channel. The pilot channel is the phase reference for the synch channel. The sign of a is determined based on the phase difference. Ideally, the phasor lies entirely on the real axis. The sign of a is determined by the real component since interference and noise effects usually yield a non-zero imaginary component. If the phase difference is closer to 0° than it is to 180°, then a=+1. If the phase difference is closer to 180° than it is to 0°, then a=−1.

FIG. 5 illustrates an exemplary structure of the pilot channel in the non-diversity transmission in accordance with aspects of the invention. The pilot channel is transmitted on the first antenna with the pilot symbol, A=1+j. The value of A remains constant during transmission.

FIG. 6 illustrates the structure of the pilot channel applying downlink transmission diversity. In this scenario, the first antenna and the second antenna are active throughout signal transmission. The pattern associated with the first antenna is the same as in the non-diversity case, i.e., the value of the pilot channel remains constant during transmission. In the pattern associated with the second antenna, the pilot symbols are +A for a pair of symbols and are −A for the next pair of symbols. The sign of the pilot symbols continues to alternate between positive and negative for each subsequent symbol pair. The structure of the pilot channel is more complicated in the diversity case than in the non-diversity case. The channel received by the mobile device is a composite of channels $h_1$ and $h_2$, and not either channel individually.

Figure 7:
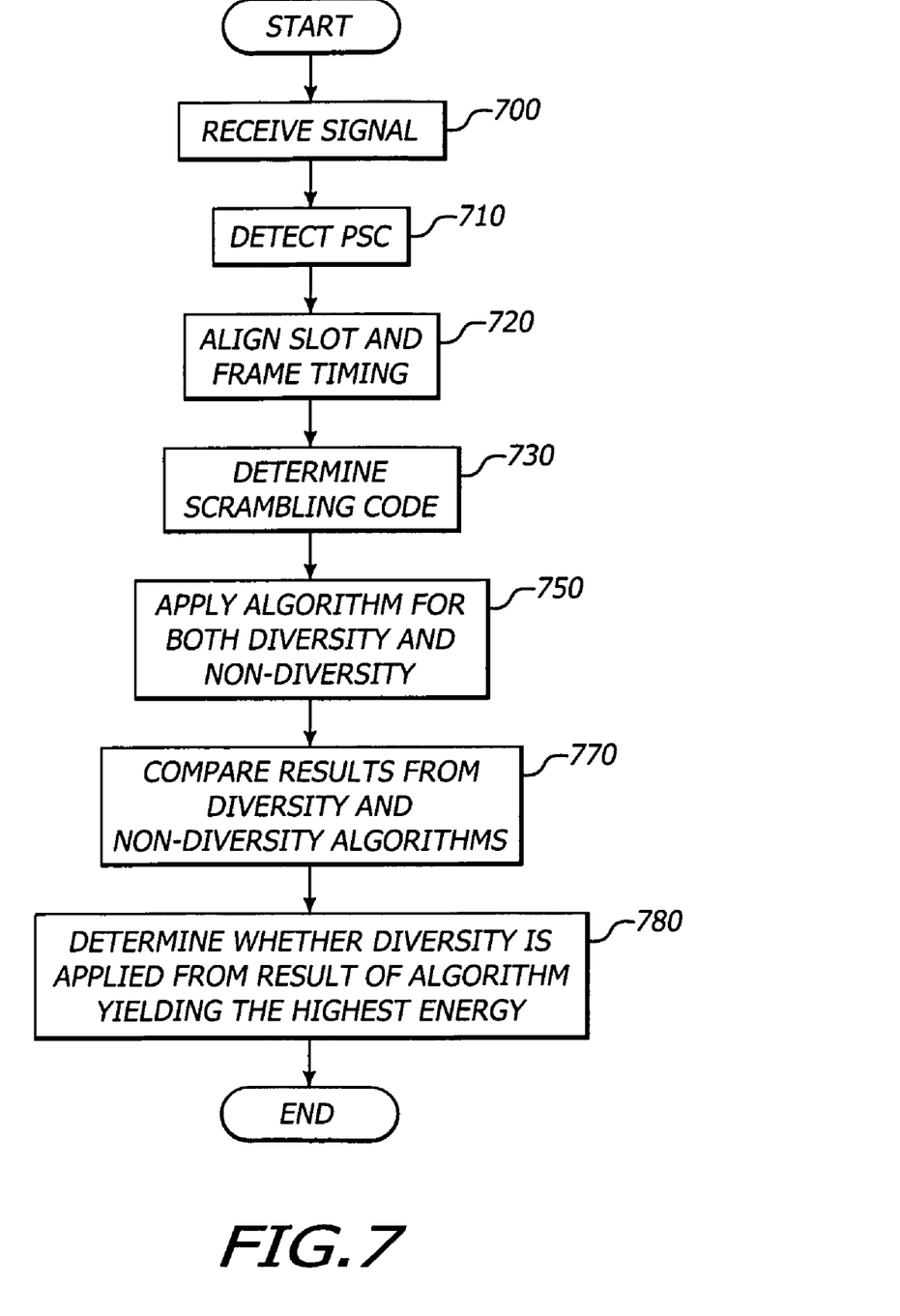
FIG. 7 illustrates a process flow of a transmit diversity detection algorithm.

FIG. 7 illustrates a process flow for the overall transmit diversity detection algorithm. First, a signal is received at the mobile device (700). Next, the primary synchronization code of the signal is despread from the synch channel of the signal (710). The slot and frame timing reference of the signal is then aligned (720). Next, a scrambling code of the pilot channel of the signal is descrambled to yield a channel estimate (730). Next, the algorithm for diversity and the algorithm for non-diversity are applied simultaneously (750). The results of the non-diversity and diversity algorithms are compared (770). The result of the algorithm yielding the highest energy is used to determine the sign of a and decide whether diversity is applied to the signal (780).

Two cross-correlation metrics ($s_i$, $p_i$) are computed over the $i^{th}$ slot, where $s_i$ despreads the PSC from the synch channel and $p_i$ descrambles the scrambling code from the pilot channel.

$$s_i = <r_i c_p>_{1:256}$$

$$p_i^* = <r_i c_{sc}>^*_{1:256/1:512}$$

where $r_i$ is the received signal over $i^{th}$ slot;

$c_p$ is the PSC code in the synch channel; and $c_{sc}$ is the scrambling code of the pilot channel.

The correlation of the synch channel with the pilot channel takes place at the same instant to obtain the same channel information from the two correlations. The PSC correlator may be used in parallel with the scrambling code correlator.

Non-Diversity Algorithm: Slow Changing Channel

Figure 8:
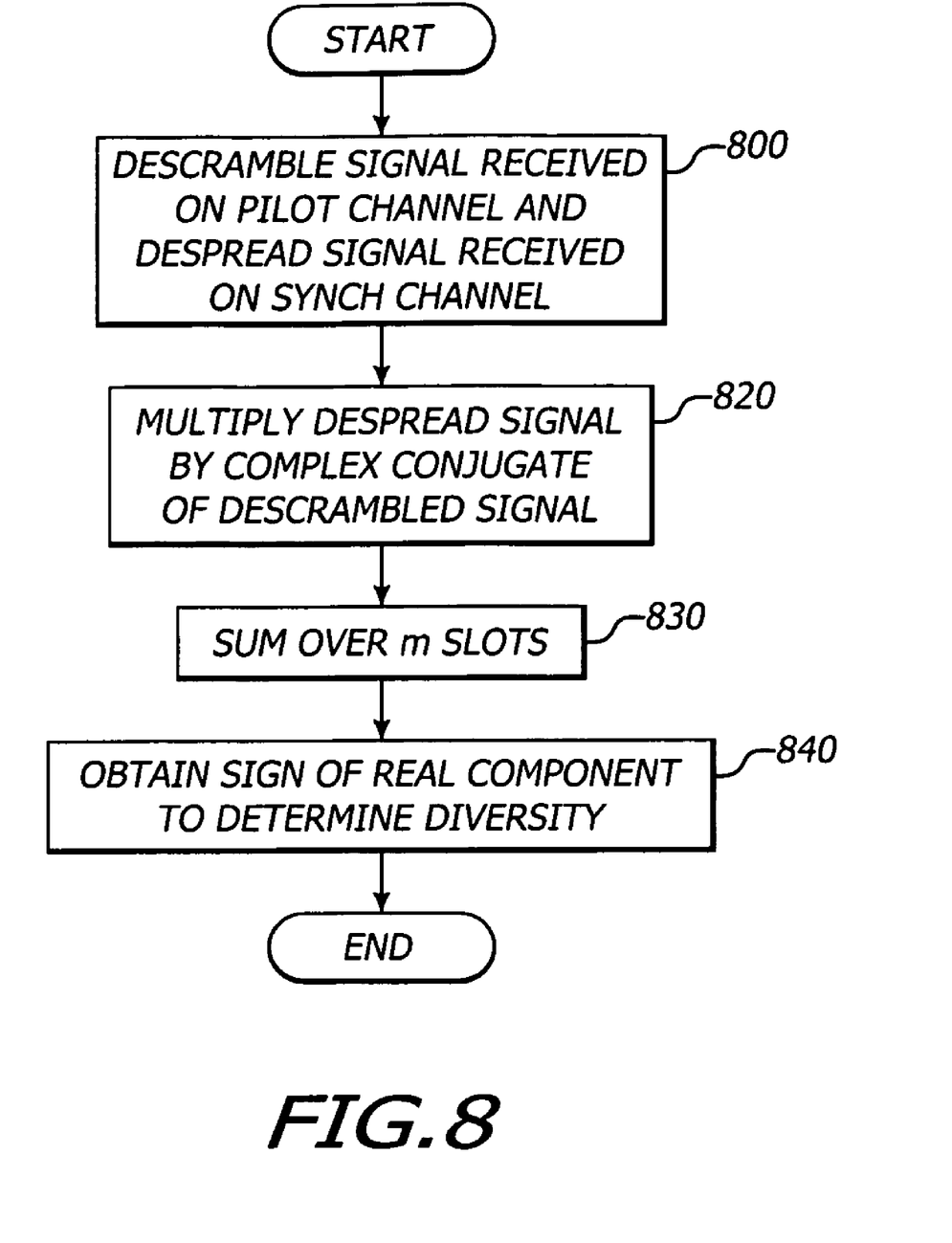
FIG. 8 illustrates a process flow for a non-diversity algorithm.

The process flow of the non-diversity algorithm for the $i^{th}$ slot is illustrated in FIG. 8. The signal received on the pilot channel is descrambled to form channel $h_1$ estimate, and the signal received on the synch channel is despread to obtain ah, (800). The despreaded signal (from 800) is derotated by multiplying by the complex conjugate of the descrambled channel (from 800) to obtain a (820). The result of step 820 is summed over m slots (830). The sign of the real component a determines diversity transmission (840).

The two noiseless correlation metrics ($s_i$, $p_i$) have the following relationships.

$$s_i \sim ah_1 c_p c_p^* = ah_1 \text{ (since } c_p c_p^* = 1)$$

Thus, $s_i$ has information on product of a and $h_1$.

$$p_i \sim h_1 c_{sc} c_{sc}^* = h_1 \text{ (since } c_{sc} c_{sc}^* = 1)$$

Thus, $p_i$ has information on $h_1$.

$$s_i p_i^* \sim ah_1 h_1^* = a|h_1|^2$$

Since $|h_1|^2 > 0$, sign of $s_i p_i^*$ depends only on a.

The final non-diversity statistic:

$$Z_{ND} = \text{Re}\left\{\sum_{m \text{ slots}} s_i p_i^*\right\}$$

For small frequency offsets, the scrambling code ($c_{sc}$) is correlated over 512 chips coherently.

$$p_i = <r_i c_{sc}>_{1:512}$$

The product of the metrics is summed over m slots and the real part is taken to obtain the overall metric for non-diversity.

$$Z_{ND,1} = \text{Re}\left\{\sum_{m \text{ slots}} s_i p_i^*\right\} \approx \text{Re}\left\{\sum_{m \text{ slots}} ah_1 h_1^*\right\} = \text{Re}\left\{\sum_{m \text{ slots}} a|h_1|^2\right\} = a \sum_{m \text{ slots}} |h_1|^2$$

Non-Diversity Algorithm: Fast Changing Channel

In the fast changing channel case, two modifications are made to the slow changing channel algorithm. First, the scrambling code and the PSC are correlated over 256 chips instead of 512 chips. The two 256-chip correlations are decomposed into two correlations over 128 chips. The metric value is computed using the results of the first 128-chip correlation, and then adding to it the metric value resulting from the second 128-chip correlation. Mathematically, this can be expressed as:

$$Z_{ND,2} = \text{Re}\left\{\sum_{m \text{ slots}} (s_{i|1:128} p_{i|1:128}^* + s_{i|129:256} p_{i|129:256}^*)\right\}$$

Diversity Algorithm Slow Changing Channel

The concept for the diversity algorithm is the same as for the non-diversity case, but two channels are derotated instead of just one. The metrics for the non-diversity case are used by correlating the received signal with the PSC and the scrambling code. The metrics are combined in a way to accomplish the aggregate derotation. Instead of computing a metric for each slot as above, a pair of slots is used to derotate the aggregate channel and obtain a sample of the diversity statistic.

By correlating the received signal with the PSC, a different channel is obtained depending on the slot. The pattern is governed by the TSTD transmission of the synch channel. Likewise, for the scrambling code, the pilot channel is transmitted with alternating signs on the pilot symbols. In the diversity case, the scrambling code is correlated over a symbol period (e.g., 256 chips) since the next symbol period will have different signs on the pilot symbols.

In the steady-state case, the following holds from a channel rotation perspective for the fourth and fifth slots:

$$(s_5-s_4)p_{4,1}^* + (s_5+s_4)p_{4,2}^* \approx a[|h_{1,t}-h_{2,t}|^2 + |h_{1,t}+h_{2,t}|^2] = 2a[|h_{1,t}|^2 + |h_{2,t}|^2]$$

Thus, if the channel does not change over 2 slots, the metric fully derotates the channel and yields a sign depending only on a.

Figure 9:
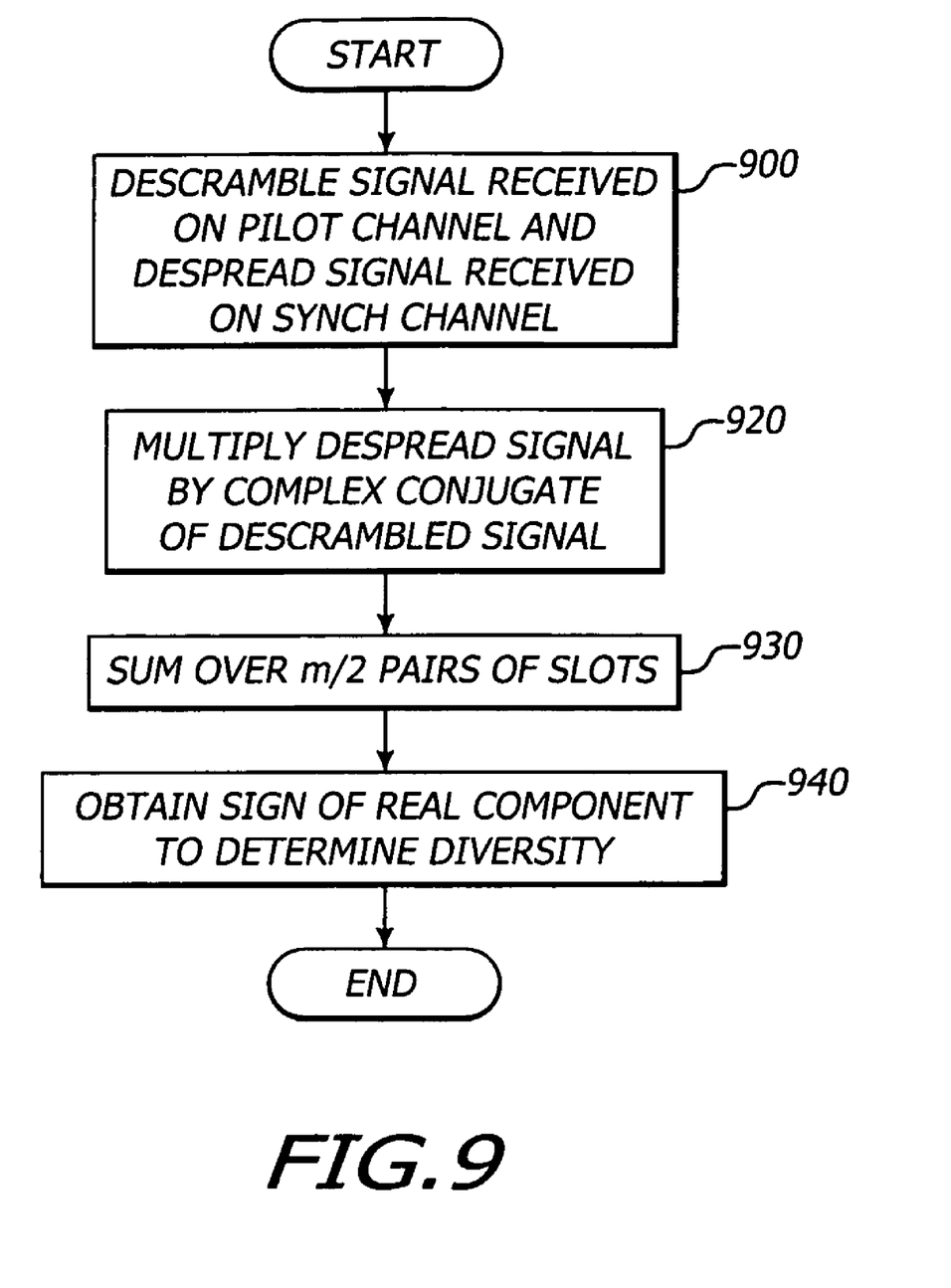
FIG. 9 illustrates process flow for a diversity algorithm.

The process flow of the diversity algorithm is shown in FIG. 9. The signal received on the pilot channel is descrambled to form channel $h_1$ estimate, and the signal received on the synch channel is despread to obtain $ah_1$ (900). The despreaded signal (from 900) is derotated by multiplying with the complex conjugate of the descrambled channel (from 900) to obtain a (920). The result of step 920 is summed over m/2 pairs of slots (930). The sign of the real component a determines diversity transmission (940).

In the diversity case, the metric is computed over pairs of slots, not over individual slots. The overall metric for diversity obtained by summing metrics over m/2 pairs of slots is:

$$Z_{D,1} = \text{Re}\left\{ \sum_{\substack{m/2 \text{ pairs} \\ of \text{ slots}}} (s_i - s_{i-1})p_{i-1,1}^* + (s_i + s_{i-1})p_{i-1,2}^* \right\}$$

A slot pair used for individual metric computation cannot cross a frame boundary, but the overall metric computation can cross the frame boundary.

Diversity Algorithm: Fast Changing Channel

The fast changing channel is characterized by the presence of frequency offsets on the order of 1500 Hz in the received signal. For frequency offsets of the same order, the channel will be different one slot later. The algorithm requires modification such that the cross-metric multiplications take place within the same slot, facilitating channel phase derotation. This can be achieved for fourth and fifth slots with the metric:

$$s_4(p_{4,2}-p_{4,1})^* + s_5(p_{5,1}+p_{5,2})^* \sim 2a[|h_{2,t}|^2 + |h_{1,t+\Delta}|^2]$$

The above equality is to be interpreted loosely as to only account for channel rotation issues, ignoring noise and interference.

According to another embodiment the algorithm splits each correlation into two separate correlations done over 128 chips (instead of 256 chips) and adds the two non-coherently. This further insulates from the effects of frequency offsets since the correlation is performed over half the frequency-offset signal. This version of the algorithm is used for initial acquisition:

$$Z_D = \text{Re}\left\{ \sum_{\substack{m/2 \text{ pairs} \\ of \text{ slots}}} \begin{pmatrix} s_{i-1|1:128}(p_{i-1,2|257:384} - p_{i-1,1|1:128})^* + \\ s_{i-1|1:129:256}(p_{i-1,2|385:512} - p_{i-1,1|129:256})^* + \\ s_{i|1:128}(p_{i,1|1:128} + p_{i,2|257:384})^* + \\ s_{i|129:256}(p_{i,1|129:256} + p_{i,2|385:512})^* \end{pmatrix} \right\}$$

Figure 10:
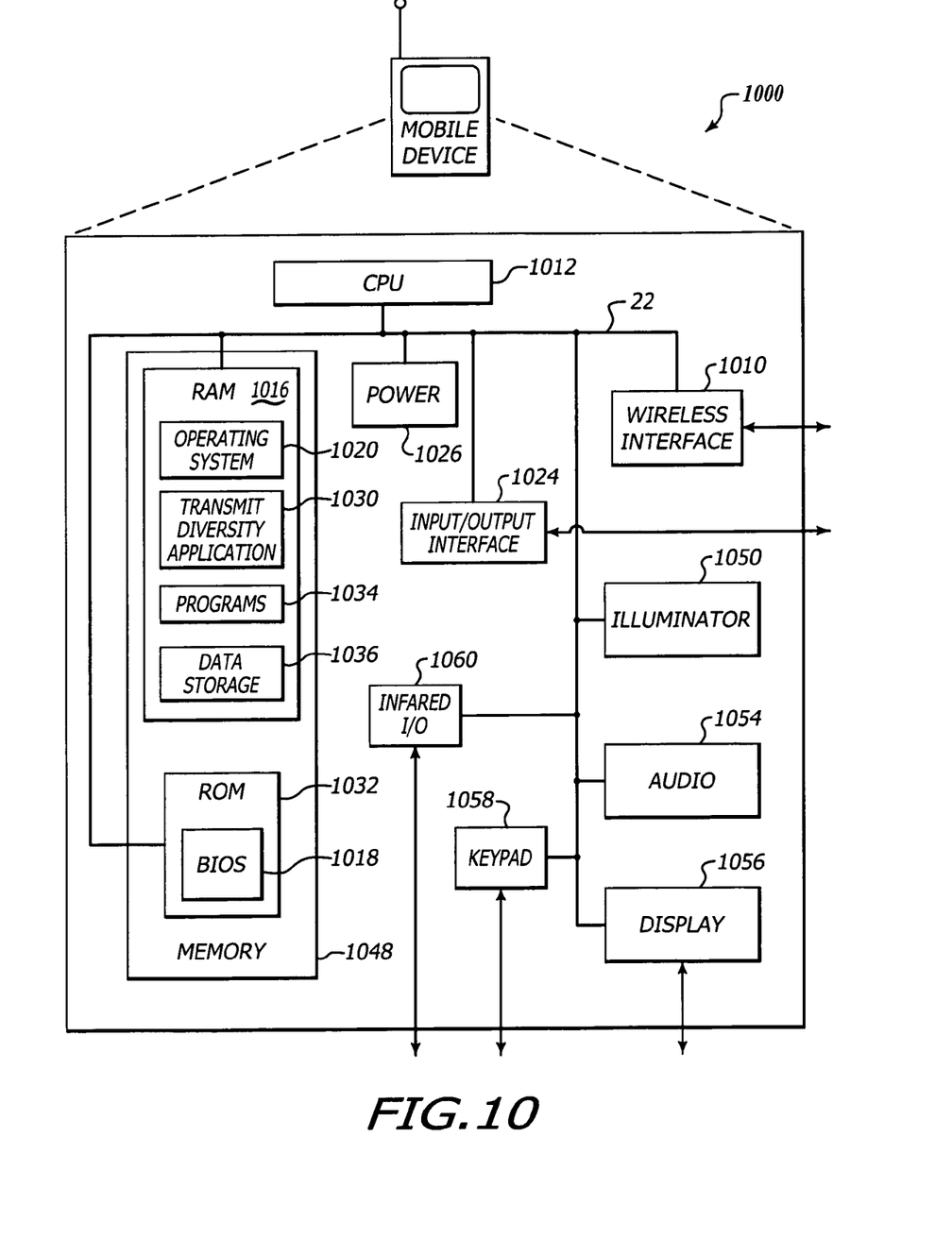
FIG. 10 shows an exemplary mobile device.

FIG. 10 shows an exemplary mobile device 1000, according to one embodiment of the invention. Generally, mobile device 1000 may include any device capable of connecting to a wireless network. Such devices include cellular telephones, smart phones, pagers, infrared (IR) devices, integrated devices combining one or more of the preceding devices, and the like. Mobile device 1000 may also include other devices that have a wireless interface such as Personal Digital Assistants (PDAs), handheld computers, personal computers, multiprocessor systems, microprocessor-based or programmable consumer electronics, network PCs, wearable computers, and the like.

Mobile device 1000 may include many more components than those shown in FIG. 10. However, the components shown are sufficient to disclose an illustrative embodiment for practicing the present invention. As shown in the figure, mobile device 1000 includes processing unit 1012, memory 1048, RAM 1016, ROM 1032, operating system 1020, transmit diversity application 1030, programs 1034, data storage 1036, bios 1018, power 1026, input/output interface 1024, wireless interface unit 1010, illuminator 1050, audio 1054, display 1056, keypad 1058, and infrared input/output 1060.

Mobile device 1000 may optionally communicate with the base station, or directly with another mobile device, via wireless interface unit 1010. Wireless interface unit 1010 includes circuitry for coupling mobile device 1000 to a network, and is constructed for use with various communication protocols including, but not limited to, UDP, TCP/IP, SMS, GPRS, Wireless Application Protocol (WAP) and the like.

Mass memory 1048 generally includes RAM 1016, ROM 1032, and one or more data storage units 1036. The mass memory stores operating system 1020 for controlling the operation of mobile device 1000. Basic input/output system ("BIOS") 1018 is also provided for controlling the low-level operation of mobile device 1000.

The mass memory also stores application code and data used by mobile device 1000. More specifically, the mass memory stores transmit diversity application 1030, and programs 1034. Transmit diversity application 1030 may be loaded into memory 1048 and run under control of operating system 1020. Also, programs 1034 may include computer executable instructions which, when executed by mobile device 1000, transmit and receive WWW pages, e-mail, audio, video, and enable telecommunication with another user of another mobile device.

Power supply 1026 provides power to mobile device 1000. A rechargeable or non-rechargeable battery may be used to provide power. The power may also be provided by an external power source, such as an AC adapter or a powered docking cradle that supplements and/or recharges a battery.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A mobile device that is arranged to support downlink transmission diversity from transmission frames that includes m slots, the mobile device comprising:
a network link that is arranged to receive signals from the transmission frame including a pilot channel signal and a sync channel signal; and
a transmit diversity application that is configured to:
concurrently apply a non-diversity detection algorithm and a diversity detection algorithm to the received signals to produce a non-diversity result metric and a diversity result metric, respectively, wherein each respective algorithm is arranged to produce the respective result metric by:
descrambling the pilot channel signal to identify a descrambled signal;
despreading the synch channel signal to identify a despreaded signal;
derotating the despreaded signal with the a complex conjugate of the descrambled signal; and
identifying the result metric from the derotated and despreaded signal;
compare the non-diversity result metric with the diversity result metric; and
determine downlink transmit diversity usage of the signal based on a phase comparison of the non-diversity result metric and the diversity result metric.

2. The mobile device of claim 1, wherein downlink transmit diversity usage is determined by the result that yields a higher energy level.

3. The mobile device of claim 1, wherein the transmit diversity application is further configured to detect a primary synchronization code (PSC) of the signal.

4. The mobile device of claim 1, wherein the transmit diversity application is further configured to align slot and frame timing references of the signal.

5. The mobile device of claim 1, wherein the transmit diversity application is further configured to determine a scrambling code of the signal.

6. The mobile device of claim 1, wherein the transmit diversity application is further configured to encode the signal using a code associated with a transmit diversity pattern and a code associated with a non-transmit diversity pattern.

7. The mobile device of claim 1, wherein the transmit diversity application is further configured to sum the product of the despreaded signal and the complex conjugate of the descrambled signal over a predetermined number of slots.

8. The mobile device of claim 7, wherein the predetermined number of slots is at least one slot for the non-diversity algorithm.

9. The mobile device of claim 7, wherein the predetermined number of slots is at least one pair of slots for the diversity algorithm.

10. The mobile device of claim 7, wherein downlink transmit diversity is applied when the sign of the real component of the summed product is positive.

11. The mobile device of claim 7, wherein downlink transmit non-diversity is applied when the sign of the real component of the summed product is negative.

12. A method for detecting transmit diversity usage at a mobile device, comprising:
receiving a signal, wherein each signal includes a pilot channel and a synch channel;
detecting a primary synchronization code from the synch channel of the signal;
aligning slot and frame timing references of the signal;
determining a scrambling code for the pilot channel of the signal;
concurrently applying a non-diversity algorithm and a diversity algorithm to the signal and producing a non-diversity result and a diversity result, respectively, wherein each of the non-divesity algorithm and the diversity algorithm are arranged for descrambling the signal received on the pilot channel, despreading the signal received on the synch channel, and derotating the despreaded signal;
comparing the result of the non-diversity algorithm with the result of the diversity algorithm; and
determining downlink transmit diversity usage of the signal based on a phase comparison of a metric associated with the non-diversity result and a metric associated with the diversity result.

13. The method of claim 12, wherein determining downlink transmit diversity usage comprises selecting the result that yields a higher energy level.

14. The method of claim 12, wherein applying the non-diversity algorithm and applying the diversity algorithm comprises multiplying the despreaded signal by a complex conjugate of the descrambled signal.

15. The method of claim 14, wherein applying the non-diversity algorithm and applying the diversity algorithm comprises summing the product of the non-diversity result and the complex conjugate of the diversity result over a predetermined number of slots.

16. The method of claim 15, wherein applying the non-diversity algorithm comprises summing the derotated signal over at least one slot.

17. The method of claim 15, wherein applying the diversity algorithm comprises summing the derotated signal over at least one pair of slots.

18. The method of claim 15, wherein determining downlink transmit diversity usage of the signal comprises selecting a real component of the summed signal.

* * * * *